United States Patent [19]
Maioli et al.

[11] Patent Number: 5,886,258
[45] Date of Patent: Mar. 23, 1999

[54] APPARATUS FOR MOUNTING AND REMOVING WHEELS OF MOTOR VEHICLES IN GENERAL ON AND FROM MACHINES HAVING A HORIZONTAL SHAFT, SUCH AS WHEEL BALANCING MACHINES

[75] Inventors: Franco Maioli; Gino Ferrari, both of Correggio, Italy

[73] Assignee: FEMAS s.r.l., Reggio Emilia, Italy

[21] Appl. No.: 990,562

[22] Filed: Dec. 15, 1997

[30] Foreign Application Priority Data

Dec. 16, 1996 [IT] Italy ................................. RE96A0102

[51] Int. Cl.[6] ..................................................... G01M 1/02
[52] U.S. Cl. ................................................ 73/487; 73/462
[58] Field of Search ............................. 73/487, 462, 464, 73/468, 66, 146, 146.2

[56] References Cited

U.S. PATENT DOCUMENTS

| | | | |
|---|---|---|---|
| 3,741,017 | 6/1973 | Reiser | 73/480 |
| 3,748,910 | 7/1973 | Hofmann | 73/487 |
| 4,741,211 | 5/1988 | Borner et al. | 73/462 |
| 5,385,045 | 1/1995 | Mannen et al. | 73/487 |

*Primary Examiner*—Hezron Williams
*Assistant Examiner*—Helen C. Kwok
*Attorney, Agent, or Firm*—Fenwick & West, LLP

[57] ABSTRACT

An apparatus for fitting, with perfect axial alignment, motor vehicle wheels of any size on the horizontal shaft of a machine, typically a wheel balancing machine, comprises two mutually facing and superimposed jaws which are moved so as to perform a mutual approach and spacing motion, by means of which they engage the tire of the wheel to be checked and/or that has already been checked and respectively disengage from the tire; a vertical motion, by means of which the jaws move between a lowered position, in which they can receive the wheel to be checked and remove the checked wheel, and a raised position, in which the jaws are arranged in a mirror-symmetrical manner with respect to the balancing shaft; and a horizontal back-and-forth motion, parallel to the balancing shaft, between a retracted position, in which the jaws support the wheel so that it is axially aligned with the shaft and arranged in front of its free end, and an extracted position, in which the jaws support the wheel so that it is axially aligned with the shaft and inserted thereon.

7 Claims, 5 Drawing Sheets

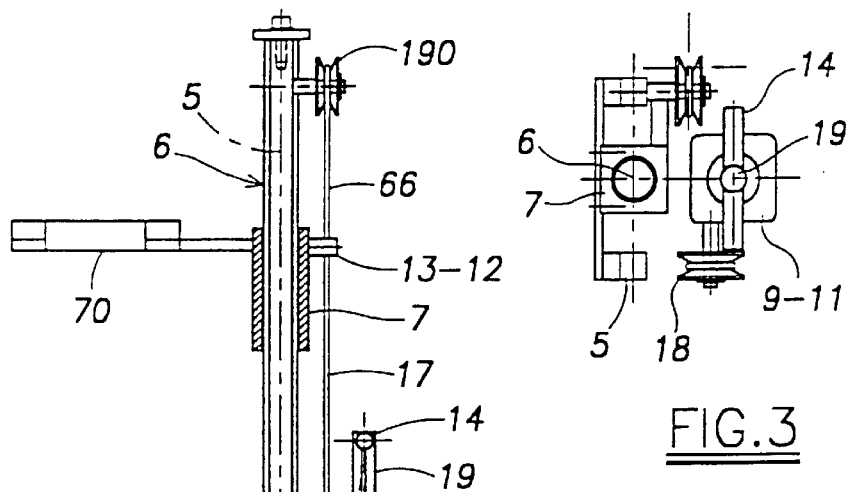
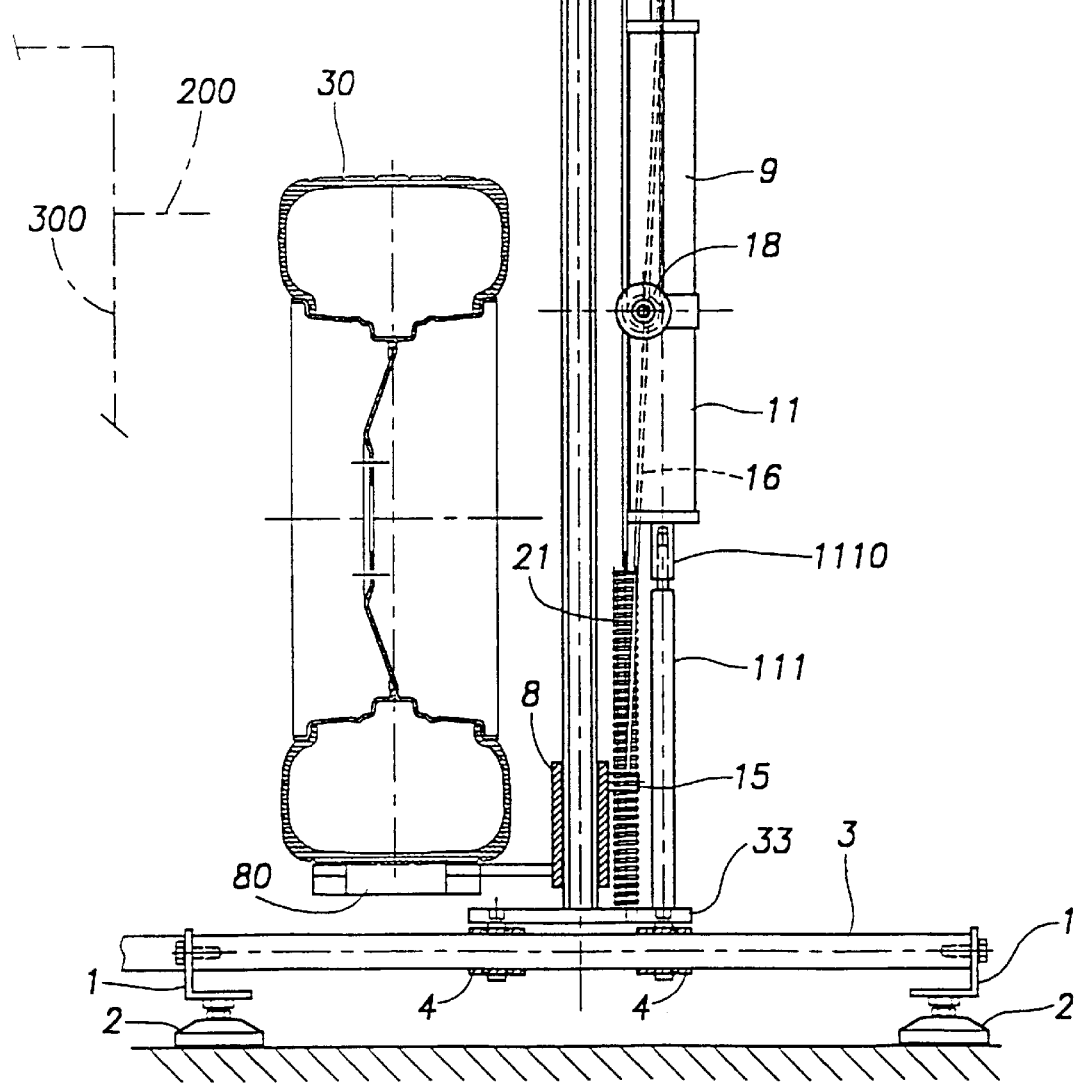

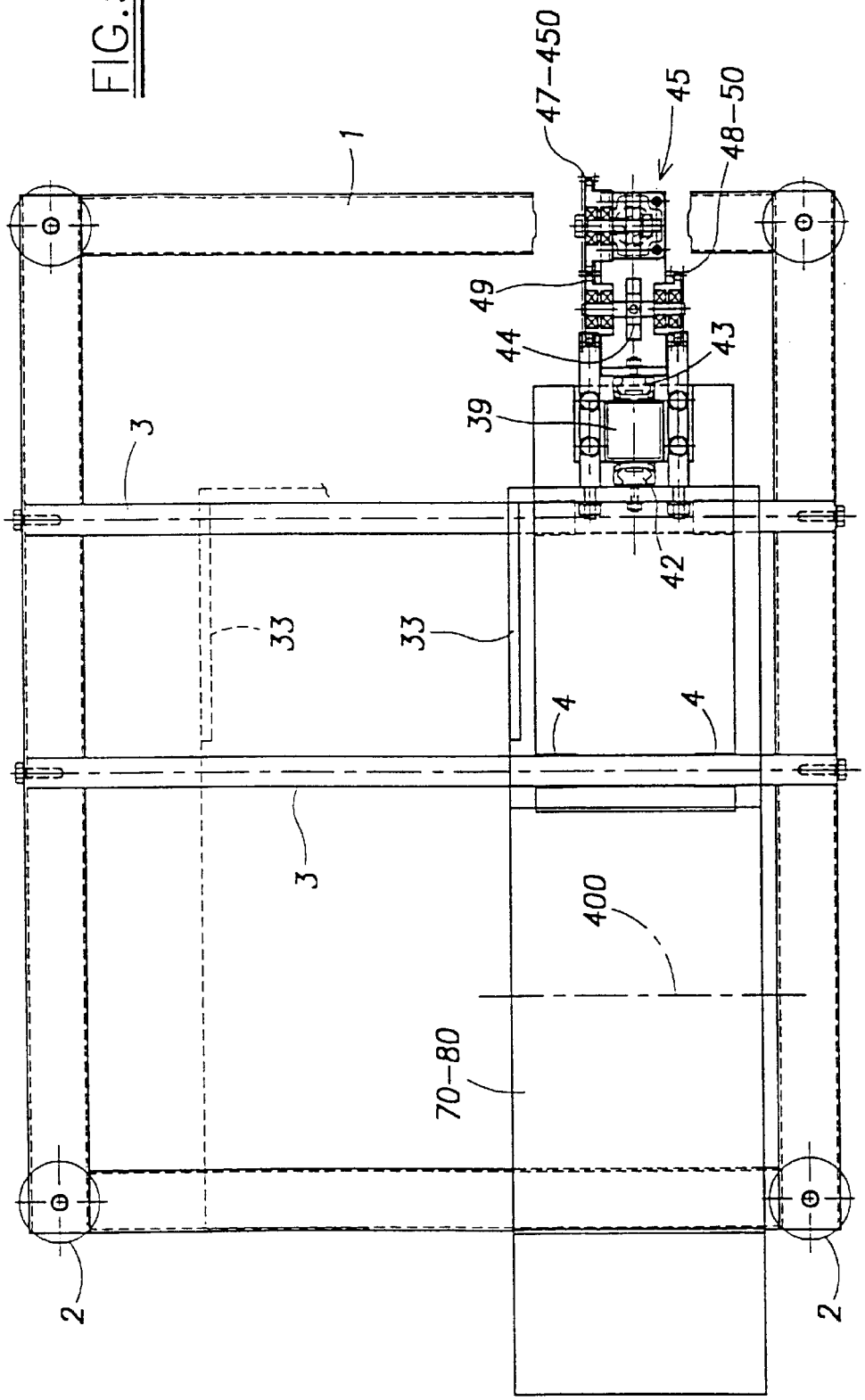

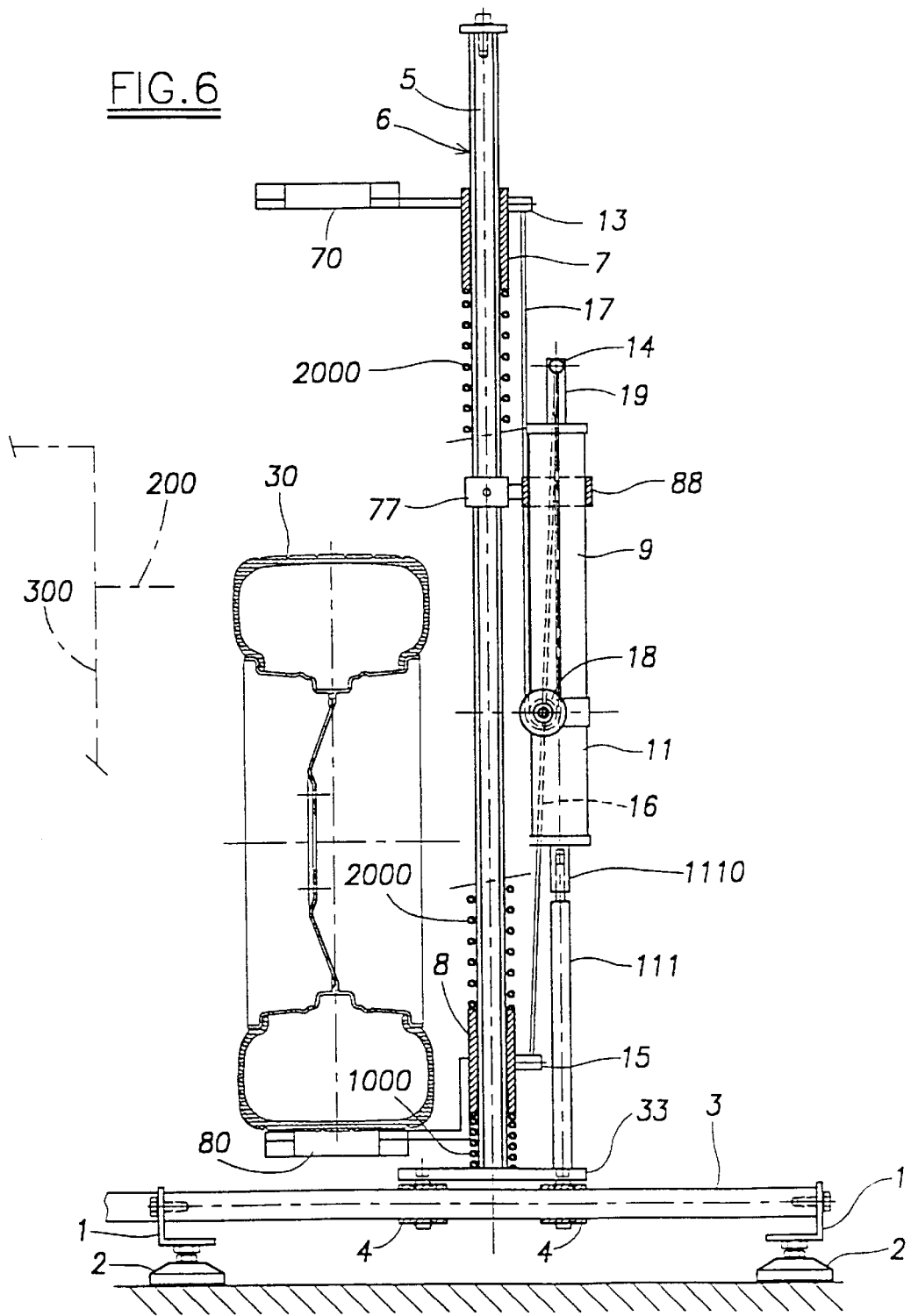

APPARATUS FOR MOUNTING AND REMOVING WHEELS OF MOTOR VEHICLES IN GENERAL ON AND FROM MACHINES HAVING A HORIZONTAL SHAFT, SUCH AS WHEEL BALANCING MACHINES

BACKGROUND OF THE INVENTION

The present invention relates to the operations for mounting and removing wheels of motor vehicles in general on machines provided with a rotating horizontal shaft on which said wheels are meant to be locked.

A typical example of such machines is constituted by wheel balancing machines, which have a cantilevered horizontal shaft on which the wheel to be balanced is fitted and appropriately locked.

With particular reference to these balancing machines, the mounting and removal operations are usually performed manually and this is particularly awkward when dealing with relatively heavy wheels.

In fact the shaft of the balancing machine is spaced from the ground by an extent which is greater than the radius of the wheel, which must therefore be lifted in order to align it axially with said shaft and fit it thereon.

Obviously, these awkward operations are particularly tiring or demanding when they must be performed repeatedly and at short intervals, as often occurs.

Furthermore, a requirement of recent statutory provisions, not only at the national level, on the issues of workplace safety and worker health is that workers who are assigned to relatively tiring duties must not be forced to perform excessive and prolonged efforts.

Hence the need for means which are adapted to meet said statutory provisions.

Furthermore, in an attempt to obviate the above, devices have been proposed which comprise a platform on which the wheel to be balanced is mounted; said platform is adapted to slide in a vertical direction under the actuation of adapted means, for example a jack with multiple telescopic elements.

However, this approach has proved to be unsatisfactory, both because the alignment between the axis of the wheel and the balancing shaft is not automatic and often requires multiple actuations of the jack and is therefore unsuitably time-consuming, and because said alignment is not precise and this usually entails, as occurs during manual mounting, undesirable friction between the metal wheel and the balancing shaft, with consequent possible inaccurate measurements.

SUMMARY OF THE INVENTION

The aim of the present invention is to eliminate the above problems while meeting the above requirement.

According to the invention, this aim is achieved through the means set forth in the appended claims, particularly by providing, on a structure which is meant to be set in front of a wheel balancing machine, a unit constituted so that it grips and supports the wheel and lifts it so as to arrange it in perfect axial alignment with the rotating horizontal shaft of said wheel balancing machine.

Said unit comprises two mutually facing jaws which are arranged one above the other and are adapted to perform three movements, namely:

- a mutual approach and spacing motion, through which hey engage the tire of the wheel to be checked and/or that has already been checked and disengage from it;

- a vertical motion, through which said jaws move between a lowered position, in which they can receive the wheel to be checked and remove the checked wheel, and a raised position, in which said jaws are arranged in a mirror-symmetrical manner with respect to the balancing shaft; and

- a horizontal back-and-forth motion, parallel to said balancing shaft, between a retracted position, in which said jaws support the wheel so that it is axially aligned with the free end of said shaft and arranged in front of it, and an extracted position, in which said jaws support the wheel so that it is axially aligned with said shaft and inserted thereon.

Said first two movements can be simultaneous or not.

BRIEF DESCRIPTION OF THE DRAWINGS

The above characteristics and the constructive and functional features of the invention will become apparent from the detailed description that follows, which is given with reference to the figures of the accompanying drawings, which illustrate, merely by way of non-limitative example, different particular and preferred embodiments thereof:

FIG. 2 is a partially sectional side view of FIG. 1;

FIG. 3 is an enlarged-scale partial top view of FIG. 2;

FIG. 5 is a top view, with cutout portions, of FIG. 4;

FIG. 6 is a view of a modified version of the embodiment of FIGS. 1 to 3.

DESCRIPTION OF THE PREFERRED EMBODIMENTS

Figure 1:
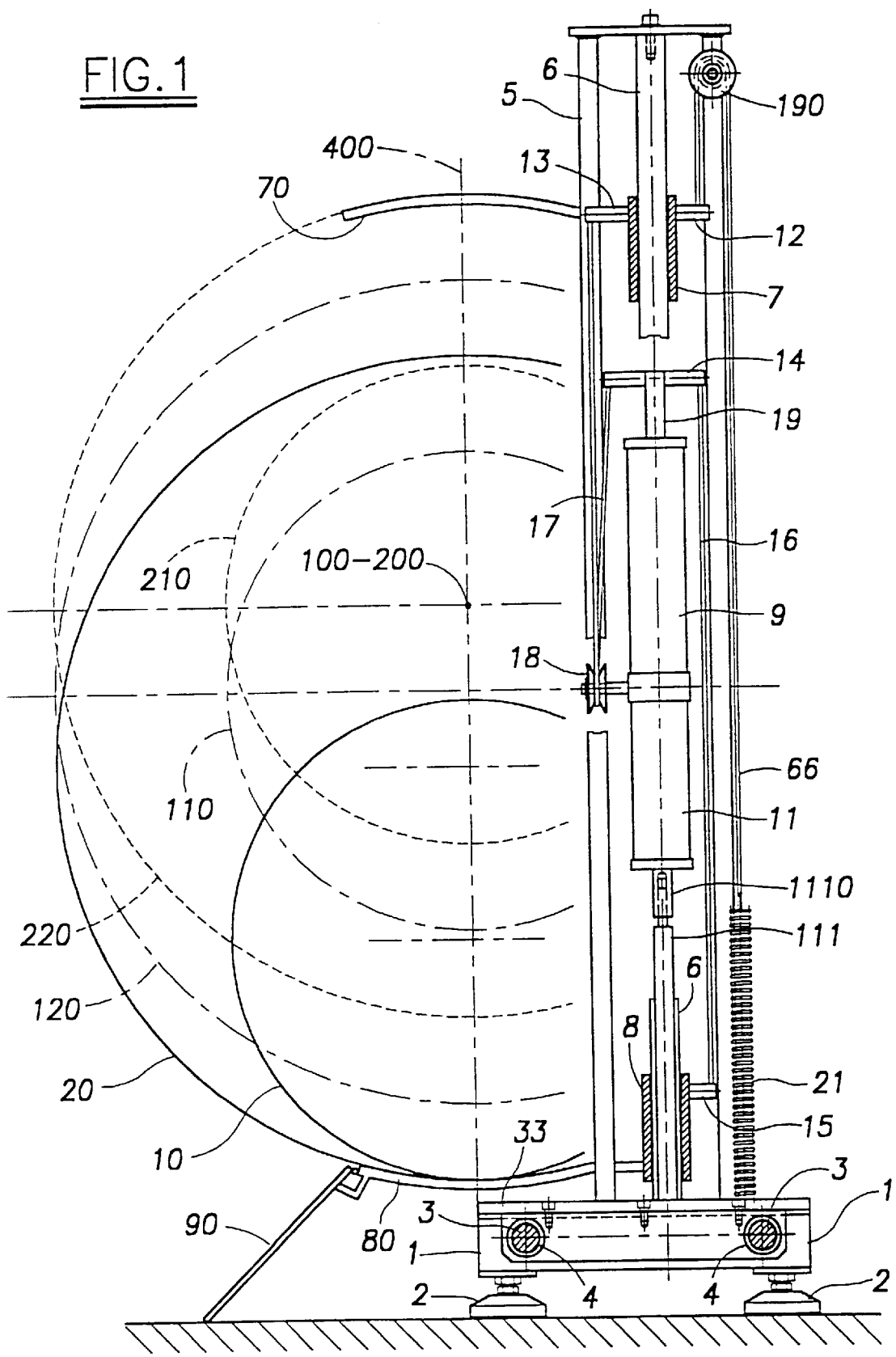
FIG. 1 is a partially sectional elevation view of the invention according to a first embodiment.

The above figures, particularly FIGS. 1 to 3, show a flat base framework 1 which lies horizontally and is mounted on adjustable feet 2.

Said framework 1, meant to be set in front of a wheel balancing machine, which is shown schematically and designated by the reference numeral 300 in FIGS. 2 and 5, has two horizontal and cylindrical bars 3 which are parallel to each other and to the rotating horizontal shaft of said machine 300.

The base 33 of an overlying flat secondary frame 5 is slidingly mounted on said bars 3 with the interposition of adapted bushes 4; said four-sided secondary frame is arranged vertically and has a central vertical bar 6.

Two sleeves, respectively an upper one 7 and a lower one 8, are slidingly mounted on the bar 6; respective superimposed jaws 70, 80 for gripping the tire of the wheels to be balanced are associated with said sleeves.

The reference numeral 10 (FIG. 1) designates a wheel which has a relatively small diameter, the reference numeral 20 designates a wheel which has a relatively large diameter, and the reference numeral 30 (FIG. 2) designates a wheel whose diameter is intermediate with respect to those of the first two wheels.

The longitudinal axis of said wheels 10, 20 and 30 is designated by the reference numeral 100, while the longitudinal axis of the balancing shaft is designated by the reference numeral 200.

The first jaw 80 of said two jaws 80 and 70 is cradle-shaped, i.e., it is shaped like a portion of a cylindrical surface, and the second jaw 70 is shaped like an inverted cradle whose internal bottom generatrix is vertically aligned with the internal bottom generatrix of the underlying jaw 80.

Figure 4:
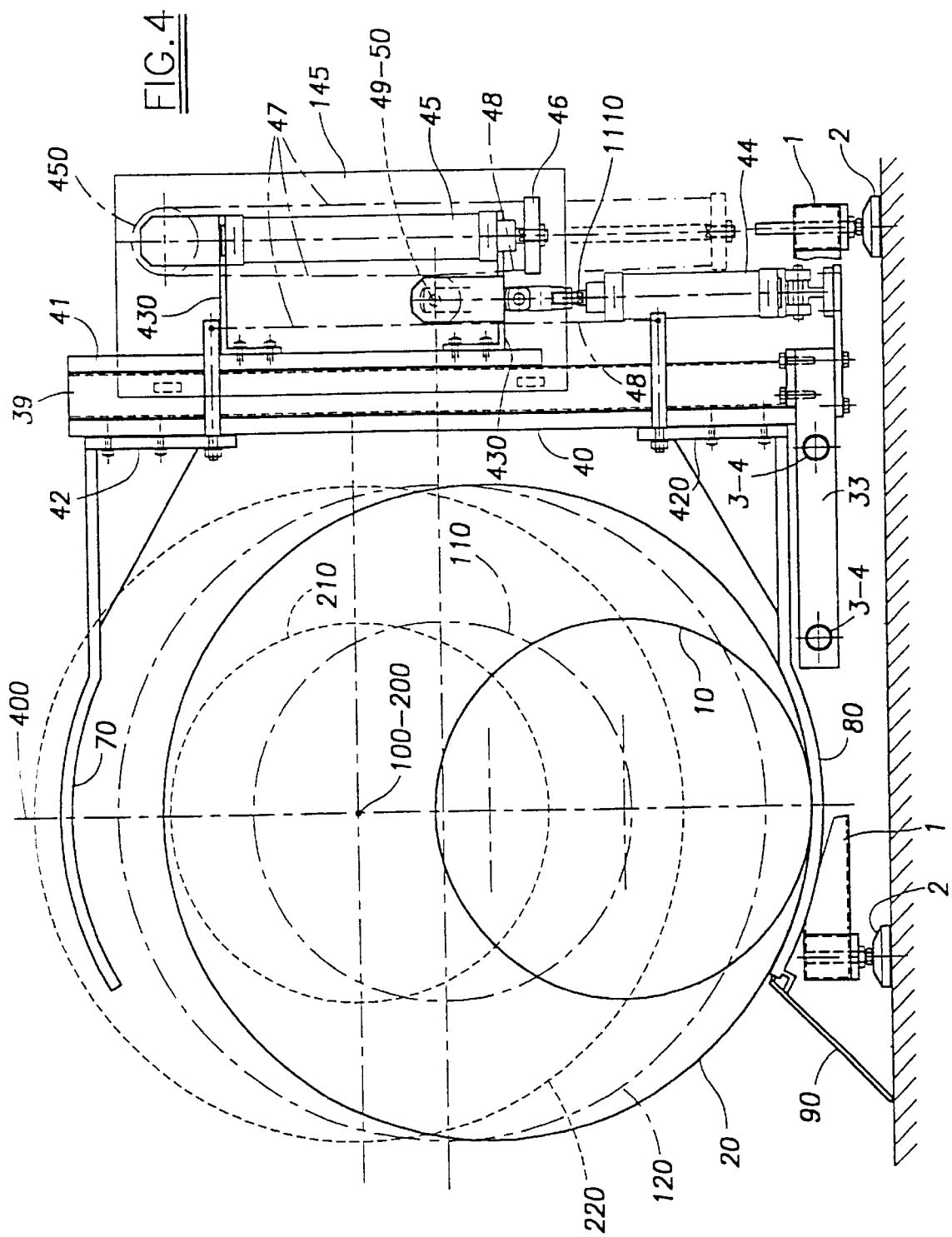
FIG. 4 is an elevation view of the invention according to another embodiment.

The framework 1 is set in front of the wheel balancing machine 300 so that the vertical plane, designated by the reference numeral 400 in FIGS. 1 and 4, that passes through said bottom generatrices also contains said axis 200.

It is also specified that by means of said adjustable feet 2 and through the means 1110 (FIGS. 1, 2, 4 and 6) mentioned hereafter, the apparatus of the invention can be adjusted so that when the wheel to be balanced is raised, as specified hereafter, the axis 100 of said wheel is arranged exactly in axial alignment with said axis 200.

Moreover, a chute or ramp 90 for mounting the wheel to be balanced and for removing the already-balanced wheel is associated with the lower jaw 80.

The above description also applies to the embodiment of FIGS. 4 and 5 and to the modified embodiment of FIG. 6.

Reverting to FIGS. 1 to 3, it is noted that on the side of the secondary frame 5 that lies opposite to the one occupied by the jaws 70, 80 there is provided an actuation unit which comprises two superimposed coaxial jacks of the double-acting type which are mutually connected; the upper jack is designated by the reference numeral 9 and the lower one is designated by the reference numeral 11; the stem 19 of the first jack 9 has a transverse wing 14 and the stem 111 of the second jack 11 is rigidly coupled to the base 33.

Said stem 111 is provided with said adjustment means 1110, which are adapted to arrange the axis 100 of the wheel 10, 20 or 30 in perfect axial alignment with the axis 200 of the balancing shaft when said wheel is in raised position; said means are constituted by a threaded system which is adapted to vary the length of the stem 111 according to the requirements.

Furthermore:

the upper sleeve 7 is provided with two mutually opposite wings 12 and 13;

the lower sleeve 8 has a wing 15;

the actuation unit 9, 11 has a small lateral pulley 18 which has a horizontal axis; and at the top of the secondary frame 5 there is provided a small pulley 190 with also has a horizontal axis.

A cable 66 is guided on the pulley 190; said cable is fixed to the wing 12 at one end and is connected, at the other end, to the upper end of a traction spring 21, whose lower end is fixed to the base 33; a second cable 17 is guided on the pulley 18 and is connected to the wing 13 at one end and to the wing 14 at the other end.

A third cable 16 is stretched between the two wings 14 and 15.

According to the alternative embodiment of FIGS. 4 and 5, a square hollow post 39 rises from the base 33 and has two mutually opposite vertical guides 40, 41; two sliders, respectively an upper one 42 and a lower one 420, are associated with the first guide 40, and the slider designated by the reference numeral 43 is associated with the second guide 41.

The sliders 42 and 420 respectively support the cradles 70 and 80 and the slider 43 has two superimposed brackets 430 between which the double-acting vertical jack 45 is locked.

There is provided a second double-acting jack 44 which is parallel to the previous one but is axially offset with respect to it; its stem is fixed to the lower bracket 430 with the interposition of means 1110 for adjusting its own length, and its body is rigidly coupled to the base 33.

Moreover, the stem of the jack 45 is directed downwards, where it has a transverse wing 46; a freely rotating toothed ring 450 is located above the rear end of said jack 45, and above the lower bracket 430 there is provided a pair of free toothed wheels which are coaxial and are designated by the reference numerals 49 and 50 respectively.

There are also provided two chains 47 and 48: the first one 47 is coupled at one end to said wing 46 and is then guided on the toothed rings 450 and 49 and is rigidly coupled, with its other end, to the upper slider 42, while the second chain 48 is coupled, with one end, to said wing 46 and is then guided on the toothed ring 50 and fixed to the lower slider 420 with its other end.

Although not shown, it is specified that a cable is coupled to the upper slider 42 and is guided inside the post 39, where it carries a counterweight meant to support said slider 42 and to tension the chain 47. The reference numeral 145 (FIG. 4) designates a protective safety housing which is arranged so as to surround the jack 45.

Finally, the stroke of the jacks 11 and 44 is preset, while the stroke of the jacks 9 and 45 depends on the diameter of the wheel 10, 20 or 30.

Moreover, adapted means, such as overpressure valves or sensors of another kind, are associated with the jacks 9 and 45; signals are sent through said means to the jacks 11 and 44, as will become apparent hereinafter.

According to the modified embodiment of FIG. 6, the cable 66, the pulley 190, the wing 12 and the spring 21 are omitted and the counterweighting function for the upper jaw 70 is assigned to a first spring 2000, which is fitted on the rod 6 and is comprised and compressed between the sleeves 7 and 8, and to a second spring 1000, which is also fitted on said rod 6 and is comprised between the sleeve 8 and the base 33.

Said second spring 1000 also has the purpose of providing a soft stroke limit for the lowering of the jaw 80. Of course, the above described elastic system can also be adopted for the solution of FIGS. 4 and 5, particularly if a cylindrical post 39 is used.

FIG. 6 shows that a support 77 is fixed to the posts of the secondary frame 5 and supports a sleeve 88 in which the unit 9 is slidingly received; said means can of course be provided for the solution of FIGS. 1 to 3 as well.

The invention according to said first embodiment and said variation operates as follows starting from the initial configuration shown in FIG. 1.

After mounting the wheel 10 or 20 on the jaw 80, the jack 9 receives the clearance signal for performing an extraction stroke; accordingly, by means of the cables 16 and 17, the two jaws 70 and 80 move mutually closer, clamping the tire, and the wheel 10 or 20 reaches the raised position designated by the reference numeral 110 or 120.

As a consequence of said clamping, the jack 11 receives the clearance signal for extracting its own stem 111; accordingly, the wheel 10 or 20 is placed in the position designated by the reference numeral 210 or 220, where its axis 100 is coaxial to the axis 200.

The actuation of the jacks 9 and 11 can, of course, be substantially simultaneous.

The base 33 is then made to slide towards the wheel balancing machine 300 to fit the central hole of the wheel on the balancing shaft; the jaws are then moved away and the wheel is locked on said shaft, and balancing is then performed.

At the end of the balancing operation, the jaws close on the wheel again, then the base 33 is moved away from the wheel balancing machine, then said jaws are lowered under the actuation of the jack 11, and finally said jaws open fully so as to arrange the lower one at the level of the floor, as shown in FIG. 1, to allow to remove the balanced wheel.

The operation is substantially the same for the embodiment of FIGS. 4 and 5.

The features and advantages of the invention are clearly understandable from the above description and from the accompanying figures.

It is understood that the invention is not limited to what has been illustrated and described but includes all technical equivalents of the cited means and combinations thereof, if provided within the scope of the appended claims.

What is claimed is:

1. An apparatus for fitting, with perfect axial alignment, motor vehicle wheels of any size on the horizontal shaft of a machine, typically a wheel balancing machine, comprising: a structure which is positionable in front of the wheel balancing machine; a gripping unit supported on said structure for gripping and supporting a wheel; two mutually facing and superimposed jaws located at said unit; and movement means being provided at said unit for moving the jaws so as to perform:

mutual approach and respectively spacing motions, for engaging a wheel to be checked and disengaging the wheel which has already been checked;

a vertical motion, between a lowered position, in which the jaws receive the wheel to be checked and remove the checked wheel, and a raised position, in which said jaws are arranged in a mirror-symmetrical manner with respect to the horizontal shaft of the machine; and a horizontal back-and-forth motion, parallel to said horizontal shaft, between a retracted position, in which said jaws support the wheel so as to be axially aligned with an axis thereof with an axis of said horizontal shaft, whereby said wheel being arranged in front of a free end of the shaft, and an extracted position, in which said jaws support the wheel so as to be axially aligned with said shaft and inserted thereon.

2. The apparatus according to claim 1, wherein said structure comprises: a base framework, said framework being provided with a pair of horizontal cylindrical bars which are parallel to said shaft; and a vertical element for guiding, supporting and allowing sliding motion of said jaws, said vertical element being slidingly mounted on said cylindrical bars.

3. The apparatus according to claim 2, comprising adjustment means associated with said base framework and with said movement means which actuate said vertical motion of the jaws, said adjustment means being adapted to adjust the position of the jaws so that the axis of the wheel coincides with the axis of said horizontal shaft.

4. The apparatus according to claim 1, wherein a lower one of said jaws is shaped like a cradle and an upper one of said jaws is shaped like an inverted cradle, and wherein an internal bottom generatrix of the lower jaw and an internal bottom generatrix of the upper jaw lie on a common vertical plane, said vertical plane containing also the axis of said horizontal shaft.

5. The apparatus according to claim 4, comprising a ramp for lifting and lowering the wheel to be checked and the already-checked wheel, said ramp being associated with said lower jaw.

6. The apparatus according to claim 1, wherein said movement means comprise a first double-acting jack for causing said mutual approach and spacing of the jaws, and a second double-acting jack for causing said vertical motion of said jaws, said second double-acting jack being adapted to make said first jack slide in a vertical direction.

7. The apparatus according to claim 6, comprising two flexible elements having any of an inverted and a crossed traction, said first jack including a stem thereof and said flexible elements extending from said stem and being further connected to said two jaws, the upper jaw being provided with a counterweight.

* * * * *